United States Patent [19]

Delebecque et al.

[11] 4,208,619
[45] Jun. 17, 1980

[54] AUTOMATONS

[75] Inventors: Robert P. Delebecque, Sceaux; Georges A. Goupil, Vitry sur Seine; Andre J. Velte, Le Chesnay, all of France

[73] Assignee: Societe Anonyme de Telecommunications, Paris, France

[21] Appl. No.: 818,336

[22] Filed: Jul. 22, 1977

[30] Foreign Application Priority Data

Aug. 6, 1976 [FR] France ............................... 76 24077

[51] Int. Cl.² .............................................. H02K 7/00
[52] U.S. Cl. .......................................... 318/4; 318/14;
  318/569; 318/603; 318/626; 414/749
[58] Field of Search ................... 318/603, 470, 626, 4,
  318/9, 14, 15, 569; 212/124, 131; 214/1 BB,
  658; 414/749, 751, 752, 426

[56] References Cited

U.S. PATENT DOCUMENTS

| 878,399 | 2/1908 | Hussong | 212/131 |
|---|---|---|---|
| 2,144,068 | 1/1939 | Kronshein | 214/17 |
| 2,353,437 | 7/1944 | Bock | 212/131 |
| 2,820,187 | 1/1958 | Parsons et al. | 318/603 |
| 3,093,252 | 6/1963 | Cahill | 214/658 |
| 3,093,781 | 6/1963 | Anhe et al. | 318/603 |

*Primary Examiner*—Gene Z. Rubinson
*Assistant Examiner*—Eugene S. Indyk
*Attorney, Agent, or Firm*—Holman & Stern

[57] ABSTRACT

An automaton comprising a fixed frame, a horizontal guiding member carried by the frame, a carrier movable along said guiding element, and a gripping member carried by the carriage and movable in a vertical direction relative to the carriage. There is provided a single motor fixed on the frame, transmission means for achieving from the motor either the horizontal movement of the carriage or the vertical movement of the gripping member, an electronic control device for the motor and transmission means, and means for measuring the angular displacement of the motor shaft connected to the electronic device.

3 Claims, 2 Drawing Figures

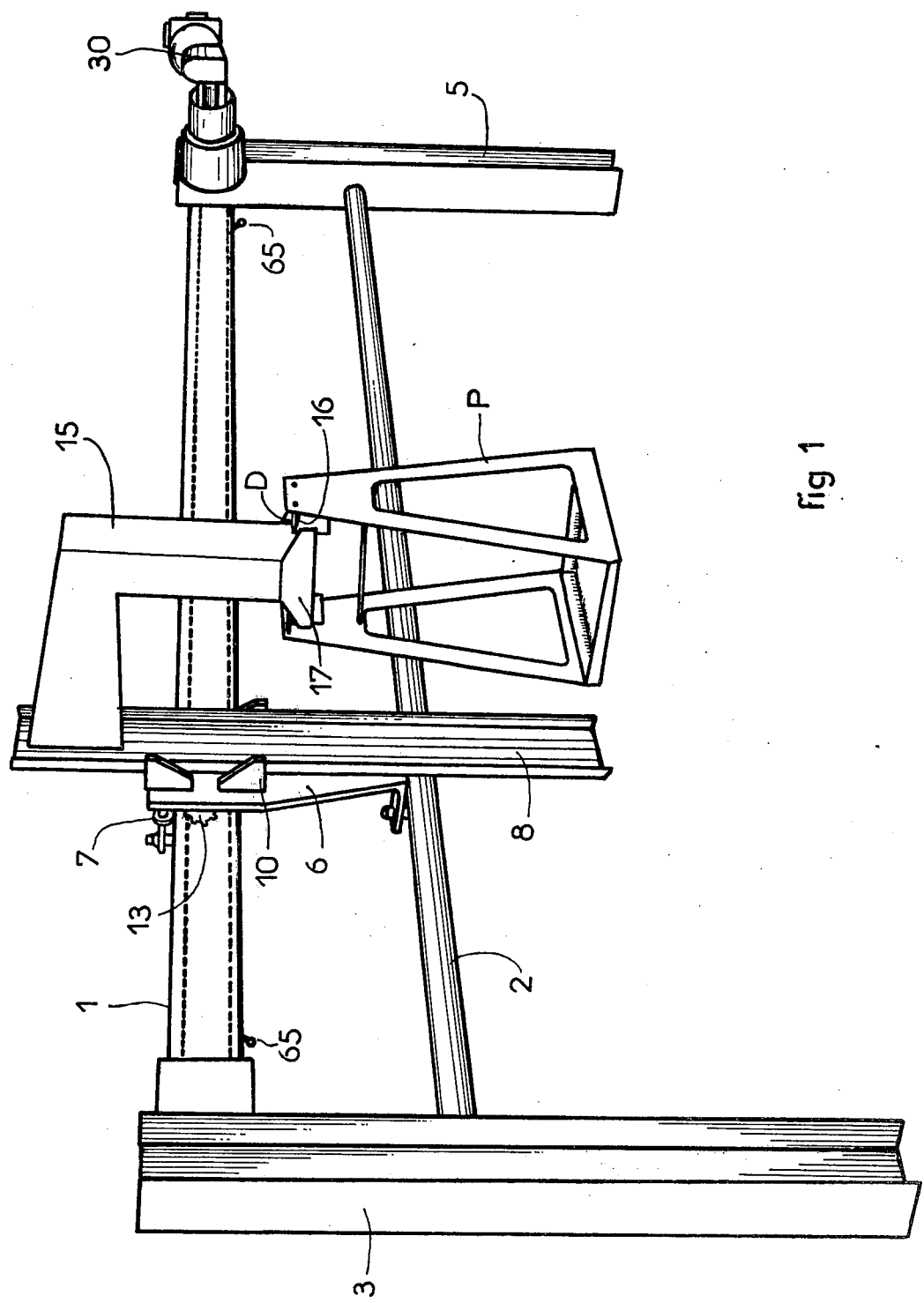

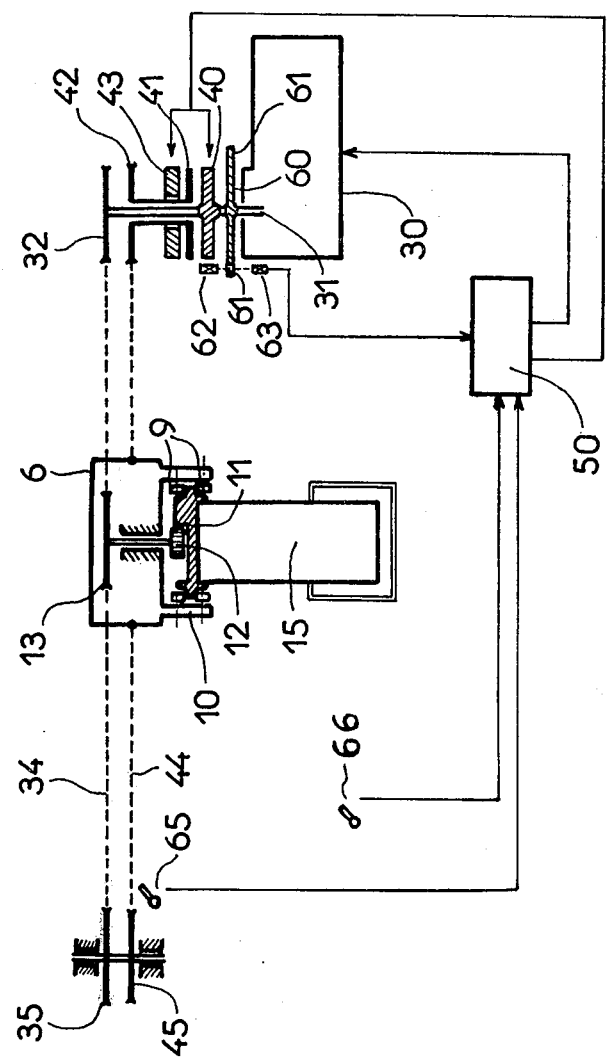

AUTOMATONS

The present invention relates to an automaton, that is a mechanical handling device the movements of which are automatically controlled according to a pre-established program.

Such devices are already known, in which a fixed frame supports a mobile bracket carrying in turn a gripping member which may move in space according to one or more defined axes. These translations movements are obtained from the rotary movements supplied by motors whose stop-start functions as well as the rotation direction are controlled through the agency of programmable timers. These known devices are on the one hand costly and on the other hand do not give full satisfaction to the user who needs a high operative accuracy in the positioning as well as the length of the stoppages.

An object of the invention is therefore to provide a handling automaton of relatively low cost, with a good movement accuracy and a very great flexibility for bringing it into operation and using it.

To this effect, the automaton according to the invention, of the type comprising a fixed frame, a horizontal guiding member, a carriage movable along said guiding element, and a gripping member carried by the carriage and displaceable in a vertical direction relative to the carriage, further comprises a single motor connected to the frame, transmission means for achieving from the motor either the horizontal displacement of the carriage or the vertical displacement of the gripping member, a control electronic device of the motor and transmission means, and means for measuring the angular displacement of the motor shaft, connected to the electronic device.

The use of a single motor provides an important simplification of the automaton structure. The automaton does not comprise a motor secured to a mobile member, and this eliminates feeding problems connected to the use of a motor which is not stationary. This feature of the automaton according to the invention is particularly advantageous when the environment is filled of corrosive vapours dangerous for the supply connections.

A further advantage is that the inertia of the mobile equipment is substantially reduced, thus providing accurate positioning at a lesser cost. Finally, all the movements, whatever their direction, are measured by means of a single device connected to the motor output shaft.

Preferably, the means for measuring the angular displacement of the motor shaft comprise a disc keyed onto the shaft and formed with a plurality of holes distributed along a circle and regularly spaced apart, and a fixed optical device comprising a source and an optical-electronic detector arranged on either side of the disc and placed radially opposite said circle.

So, if the disc carries n holes, the detector will transmit a signal each time the shaft has turned through an angle of $2\pi/n$. This rotation of $2\pi/n$ defines a step corresponding to a determined displacement of the gripping member in a given direction.

In a preferred embodiment, the transmission means comprise a first sprocket secured to the motor shaft, an endless chain driven by said first sprocket which drives in turn an idle sprocket carried by the carriage and connected to a pinion which meshes with a vertical rack carried by the gripping member, a second sprocket mounted on the motor shaft, a clutching member for coupling said second sprocket to the motor shaft and a brake for blocking it in rotation, and a second chain connected to the carriage and driven by said second sprocket.

So, the horizontal displacements are provided when both chains turn, the second sprocket coupled to the motor shaft by the clutching member, and the vertical displacements being obtained when only the endless chain turns, the second sprocket being then blocked by the brake.

The invention will become more apparent from the following description of one embodiment thereof made in conjunction with the accompanying drawings, wherein:

FIG. 1 is a perspective view of the automaton according to the invention, and

FIG. 2 is a principle diagram of the automaton.

The automaton shown in FIG. 1 is more particularly designed for the transportation of baskets containing articles which have to be subjected to a treatment between treatment vats. The treatment may consist in successive cleanings by immersion of said articles in several vats forming a washing line, the articles being for instance printed circuit cards. The automaton according to the invention may however be used in other applications.

The automaton according to the invention comprises a a frame with a U-shaped rail 1 and a round tube 2 arranged horizontally, and uprights 3 and 5 for fixation on the ground and supporting rail 1 and tube 2.

The carriage 6 is guided horizontally on rail 1 via rollers 7 and bears on tube 2. Carriage 6 carries a bracket 8 vertically guided via rollers 9 between the extension 10 of the carriage. The bracket 8 carries a vertical rack 11 (FIG. 2) in mesh with a pinion 12 carried by the carriage and may thus move vertically when sprocket 12 is rotated through hereinafter described means.

Bracket 8 carries a bent gripping member 15 the lower end of which is arranged for transportation from one point to another of a basket P. On the example shown, basket P comprises at its upper end fingers D and the gripping member 15 comprises at its lower end V-shaped members 16 fixed on plate 17.

For hooking a basket P on the gripping member 15, the following movements are necessary: downward movement of the gripping member 15 until the V-shaped member 16 are positioned lower than fingers D, horizontal displacement for placing the V-shaped members under the fingers, and upward movement for lifting the basket. The unhooking requires the reverse operations.

It should be noted that the use of the V-shaped members 16 and fingers D is only an example of one embodiment, and the hooking and unhooking may be achieved through the cooperation of any appropriate means provided on the basket and gripping member.

The movements of the gripping members 15 are obtained from a single geared-motor assembly 30, the motor being of the direct-current type. A sprocket 32 is keyed onto shaft 31 and drives an endless chain 34 which meshes with a return sprocket 35 mounted idle on the opposite end of rail 1. Said chain 34 drives on the other hand a sprocket 13, the axis 14 of which is supported by carriage 6 and forms also the axis of pinion 12 meshing with rack 11.

The motor output shaft 31 carries also a clutching disc 40 for driving a disc 41 secured to a sprocket 42. A brake 43 is also provided for blocking disc 41, and brake 43 and clutching disc 40 are driven in such manner that disc 41 is either engaging the brake and blocked, or rotatively driven by the clutching disc.

Sprocket 42 drives a chain 44 which meshes with a return sprocket 45 mounted idle at the opposite end of rail 1. Chain 44 is secured by its ends to carriage 6 so that when sprocket 42 turns, carriage 6 runs horizontally along rail 1.

With the transmission assembly just described, either a horizontal displacement or a vertical displacement of the gripping member 15 is achieved, the selection of these movements being provided by the control of the clutch 40 and brake 43 assembly.

If disc 41 is blocked by brake 43, sprocket 42 does not rotate. Carriage 6 is then stationary in relation to rail 1. Sprocket 32 drives chain 34 which rotates sprocket 13 and consequently pinion 12, and bracket 8 is moved vertically in relation to carriage 6 due to the cooperation of pinion 12 and rack 11.

If disc 41 is rotatively driven, sprocket 42 drives chain 44. Carriage 6 runs along rail 1. At the same time, chain 34 turns, but since sprocket 13 is carried by carriage 6 and moves with it, it is not rotatively driven by chains 34 and no vertical displacement of bracket 8 occurs.

The pack of instructions necessary for the operation of the automaton, i.e. start-stop, direction of rotation and speed of the motor and selection of clutch or brake, are provided by an electronic control device 50 of conventional type. Said device comprises a paper tape reader and delivers control pulses depending on the data inscribed on the paper tape.

However, it is necessary to supply device 50 with the measurements of the effective displacement of the gripping member 15 while it is being displced. The control device 50 comprises in fact, in conventional manner, a pulse counter which is preset at the beginning of each displacement by the corresponding instruction stored on the paper tape and which should therefore receive pulses, the number of which being indicative of the displacement. When the number of pulses received equals the value defined by the paper tape, the counter delivers a pulse which controls the stoppage of the displacement.

This measurement of the displacements is supplied advantageously by a device comprising a disc 60 keyed onto the motor shaft 31, formed with a series of holes 61, for instance sixty holes, regularly distributed along a circle, an optical source 62 such as an electroluminescent diode, and an optical detector 63 as for instance a photo-transistor, the source and the detector being stationary. When a hole 61 comes in alignment with the diode 62 and the detector 63, the detector receives the source radiation and transmits the pulse. The transmission of a number N of pulses by detector 63 corresponds to a shaft rotation of $N \cdot 2\pi/n$, n being the number of holes, such a rotation corresponding itself to a determined displacement of the gripping member in a given direction.

On the other hand, during the stop times, used for instance for dripping the plates, the counter receives the pulses transmitted by an internal clock of device 50 of frequency 1 Hz; the counter counts therefore seconds instead of displacement steps.

Moreover, limit switches 65, 66 are provided on rail 1 at the ends of the horizontal and vertical travels of carriage 6. These switches are placed respectively at the loading point and unloading point of baskets P. The signals produced by said switches 65, 66 cause—re-setting of the counter of device 50 at each cycle, in such manner as to prevent the position inaccuracies to cumulate over several cycles.

What we claim is:

1. An automaton comprising a fixed frame, a horizontal guiding member carried by the frame, a carriage movable along said guiding member, a gripping member carried by the carriage and movable in a vertical direction relative to the carriage, a motor fixed on the frame, a first sprocket secured to the output shaft of said motor, an endless chain meshing with said first sprocket, an idle sprocket carried by said carriage and meshing with said endless chain, a pinion rotatable with said idle sprocket, a vertical rack carried by the gripping member and engaging said pinion, a clutching member secured to said output shaft, a freely rotatable disc engageable with said clutching member, a braking member engageable with said disc to restrain the latter against rotation, a second sprocket rotatable with said disc, a second chain meshing with said second sprocket and secured to the carriage for horizontal displacement when said disc and said clutching member are in engagement, an electronic device for controlling operation of the motor and engagement of said disc with either one of said clutching and braking members engagement of said disc with said braking member permitting rotation of said pinion relative to said carriage to raise and lower said gripping member, and sensor means connected to the electronic device, for measuring the angular displacement of the motor shaft.

2. An automaton according to claim 1 wherein the control electronic device comprises a paper tape reader and a counter preset by the instructions delivered by the paper tape reader and delivering control pulses when the count reaches zero, said counter receiving the pulses transmitted by said sensor means during movements of the gripping member and pulses supplied by a clock which is part of the control device during stops of the gripping member.

3. An automaton according to claim 2, comprising limit switch means corresponding to each movement direction of the gripping member, the emission of a signal by said switch means causing re-setting of said counter.

* * * * *